US011275972B2

(12) United States Patent
Sivakumar et al.

(10) Patent No.: US 11,275,972 B2
(45) Date of Patent: Mar. 15, 2022

(54) IMAGE CLASSIFICATION MASKING

(71) Applicant: INTERNATIONAL BUSINESS MACHINES CORPORATION, Armonk, NY (US)

(72) Inventors: Gandhi Sivakumar, Bentleigh (AU); Craig M. Trim, Ventura, CA (US); Michael Bender, Rye Brook, NY (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/678,084

(22) Filed: Nov. 8, 2019

(65) Prior Publication Data

US 2021/0142121 A1 May 13, 2021

(51) Int. Cl.
*G06K 9/62* (2022.01)
*G06F 16/583* (2019.01)
*G06F 21/62* (2013.01)

(52) U.S. Cl.
CPC ......... *G06K 9/6267* (2013.01); *G06F 16/583* (2019.01); *G06F 21/6245* (2013.01); *G06K 9/6215* (2013.01)

(58) Field of Classification Search
CPC .............. G06K 9/6215; G06K 9/6267; G06F 21/6245; G06F 16/583
See application file for complete search history.

(56) References Cited

U.S. PATENT DOCUMENTS

| 6,356,339 | B1 * | 3/2002 | Enomoto | H04N 1/3871 |
| | | | | 348/586 |
| 7,668,345 | B2 * | 2/2010 | Kiyohara | G08B 13/19671 |
| | | | | 382/115 |
| 7,715,591 | B2 * | 5/2010 | Owechko | G06K 9/6292 |
| | | | | 382/104 |

(Continued)

FOREIGN PATENT DOCUMENTS

WO 2016191528 A1 12/2016

OTHER PUBLICATIONS

Jourabloo, et al., "Attribute Preserved Face De-identification", Department of Computer Science and Engineering, Michigan State University, 8 pages.

(Continued)

*Primary Examiner* — Mia M Thomas
(74) *Attorney, Agent, or Firm* — L. Jeffrey Kelly

(57) ABSTRACT

An embodiment of the invention may include a method, computer program product and computer system for image classification and masking. The method, computer program product and computer system may include computing device which may receive image data from one or more sources. The computing device may classify the image data utilizing visual recognition classification and identify one or more classified features, each classified feature being associated with one or more attributes. The computing device may analyze the classified image data to determine if one or more of images of the classified image data contains one or more sensitive attributes. In response to determining one or more images of the classified image data contains one or more sensitive attributes, the computing device may apply a masking technique and may generate one or more masked images.

17 Claims, 9 Drawing Sheets

(56) References Cited

U.S. PATENT DOCUMENTS

| | | | | |
|---|---|---|---|---|
| 8,098,904 | B2* | 1/2012 | Ioffe | G06K 9/00281 |
| | | | | 382/118 |
| 8,570,403 | B2* | 10/2013 | Lee | H04N 5/272 |
| | | | | 348/239 |
| 8,858,699 | B2* | 10/2014 | Van Remortel | C09D 17/004 |
| | | | | 106/400 |
| 9,298,969 | B2* | 3/2016 | Sako | G06T 11/60 |
| 9,858,699 | B2 | 1/2018 | Gordon | |
| 10,242,282 | B2* | 3/2019 | Loce | G06K 9/6277 |
| 10,691,971 | B2* | 6/2020 | Chang | G06K 9/4609 |
| 2008/0298704 | A1* | 12/2008 | Nachlieli | G06T 5/003 |
| | | | | 382/254 |
| 2016/0225053 | A1* | 8/2016 | Romley | G06Q 30/0623 |
| 2017/0132866 | A1* | 5/2017 | Kuklinski | G07D 7/2083 |
| 2017/0200290 | A1* | 7/2017 | Bhattiprolu | G06K 9/4619 |
| 2018/0143430 | A1* | 5/2018 | Koppal | G02B 27/0172 |
| 2018/0150484 | A1* | 5/2018 | Dupey | G06N 7/005 |
| 2018/0189512 | A1* | 7/2018 | Monaco | G06F 3/0608 |
| 2019/0171906 | A1* | 6/2019 | Sodhani | G06K 9/6201 |
| 2019/0206117 | A1* | 7/2019 | Xiong | G06T 7/11 |
| 2020/0012898 | A1* | 1/2020 | Zhao | G06N 5/046 |
| 2020/0012935 | A1* | 1/2020 | Goodsitt | G06F 11/3688 |
| 2020/0027209 | A1* | 1/2020 | Madabhushi | G06T 5/50 |
| 2020/0082167 | A1* | 3/2020 | Shalom | G06N 3/08 |
| 2020/0111019 | A1* | 4/2020 | Goodsitt | G06N 20/10 |
| 2020/0231382 | A1* | 7/2020 | O'Herlihy | G06Q 50/28 |
| 2020/0302246 | A1* | 9/2020 | Shen | G06K 9/6263 |
| 2020/0364501 | A1* | 11/2020 | Herz | G07G 1/0063 |
| 2020/0394401 | A1* | 12/2020 | Baughman | G06N 3/0454 |
| 2021/0150703 | A1* | 5/2021 | Levanony | G06N 3/08 |
| 2021/0287023 | A1* | 9/2021 | Hotson | G06T 7/90 |
| 2021/0297629 | A1* | 9/2021 | Lemes da Silva | G06N 3/04 |
| 2021/0397737 | A1* | 12/2021 | De Berker | G06N 3/08 |

OTHER PUBLICATIONS

Mell et al., "The NIST Definition of Cloud Computing", National Institute of Standards and Technology, Special Publication 800-145, Sep. 2011, 7 pages.

Rouse, "What is data masking?", Definition from Whatis.com, Updated Oct. 2009 [accessed on Jul. 31, 2019], 4 pages, Retrieved from the Internet: <https://searchsecurity.techtarget.com/definition/data-masking>.

Screen capture from YouTube video clip entitled "HoloLens Application on Premset", 1 page, uploaded on Feb. 22, 2017 by user "Schneider Electric", Retrieved from Internet: <https://www.youtube.com/watch?v=RpXyagutoZg>.

Wikipedia, "Luhn algorithm", [accessed on Jul. 31, 2019], 3 pages, Retrieved from the Internet: <https://en.wikipedia.org/wiki/Luhn_algorithm>.

\* cited by examiner

IMAGE CLASSIFICATION MASKING

BACKGROUND

The present invention relates generally to a method, system, and computer program for image classification masking. More particularly, the present invention relates to a method, system, and computer program for masking sensitive information in images prior to image classification.

Data masking protects data classified as personal identification data or personally/commercially sensitive by reformatting it into a structurally similar, but inauthentic version of that data. The purpose is to protect the personal or otherwise sensitive data while having a functional substitute for occasions when the real data is not required. For example, data masking might replace the real names of participants in a study with fake names to protect their identity. However, to retain the gender integrity of this list of names, real male names may be replaced with fake male names from a lookup table, and real female names may be replaced with fake female names. Image masking enables a portion of an image to be obscured or redacted for security purposes, such as, protecting personal identity, personal information, or sensitive information contained within the image.

BRIEF SUMMARY

An embodiment of the invention may include a method, computer program product and computer system for image classification and masking. The method, computer program product and computer system may include computing device which may receive image data from one or more sources. The image data may comprise one or more images. The computing device may classify the image data utilizing visual recognition classification and identify one or more classified features contained within the classified image data, each classified feature being associated with one or more attributes. The computing device may analyze the classified image data to determine if one or more images of the classified image data contains one or more sensitive attributes. The computing device may analyze the classified image data to determine if one or more of the images contains one or more sensitive attributes using user-defined sensitive attributes or by using a rules-engine application. In response to determining one or more images of the classified image data contain one or more sensitive attributes, the computing device may apply a masking technique to the one or more images of the classified image data containing the one or more sensitive attributes. The masking technique used by the computing device may be substitution image classification masking, variance image classification masking, and/or shuffling image classification masking. The computing device may generate one or more masked images. The one or more masked images may comprise the one or more of the images determined to contain sensitive attributes with the sensitive attributes masked. The computing device may generate a corpus of images, which may comprise the one or more masked images and remaining images of the classified image data containing no sensitive attributes. The computing device may transmit the corpus of images with sensitive attributes masked to a visual analysis system to detect insights and trends based on the corpus of images.

BRIEF DESCRIPTION OF THE DRAWINGS

FIG. 1b illustrates example operating modules of the image classification and masking program of FIG. 1a.

DETAILED DESCRIPTION

Figure 1A:
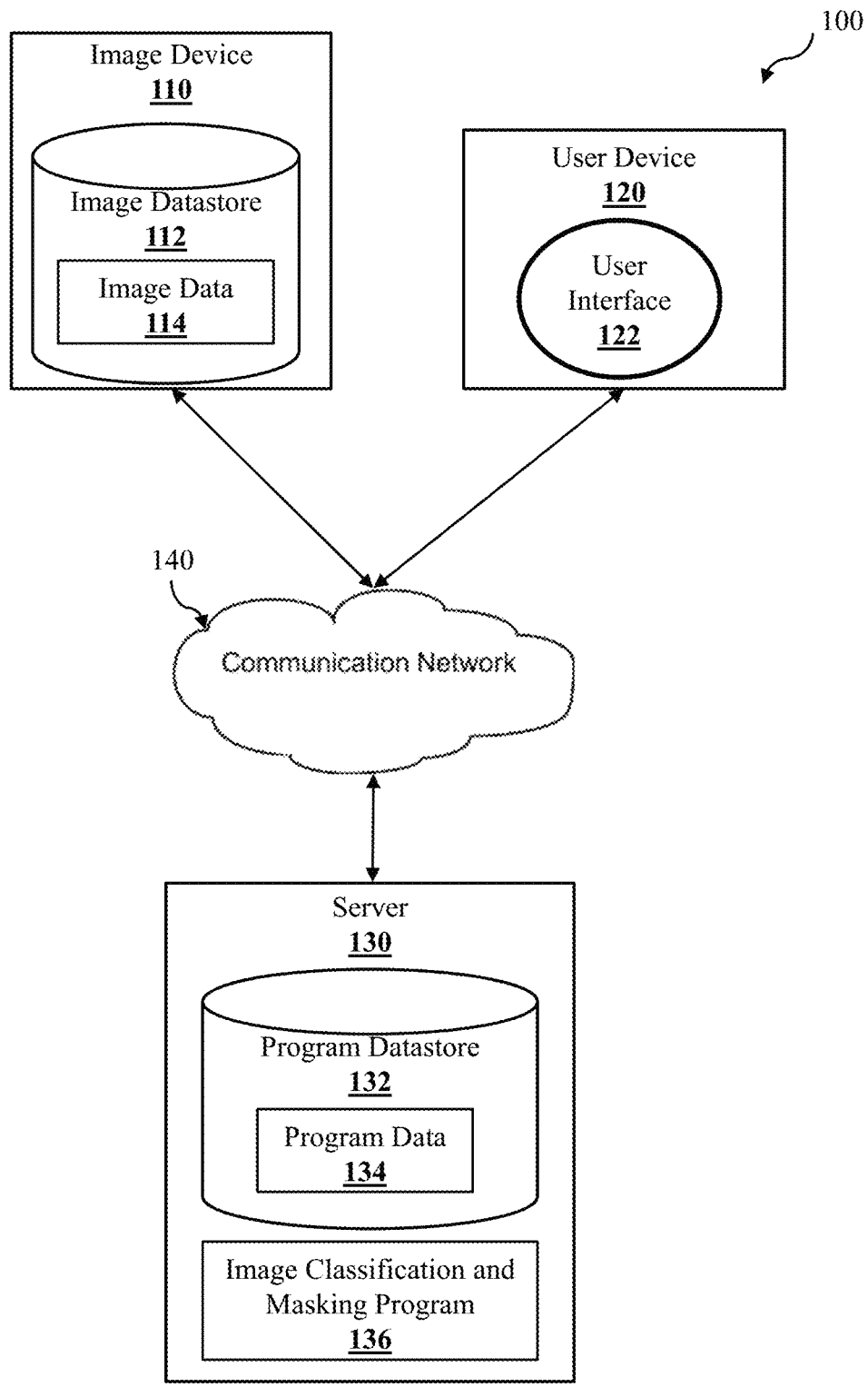
FIG. 1a illustrates a system for image classification and masking, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Masking of images enables a portion of an image to be obscured or redacted for security purposes. Image masking may be performed to protect personal identity, personal information, and/or sensitive data. For example, a security camera system in a parking garage may redact all license plate numbers for sensitive data reasons. Obscuring or redacting information in a photograph completely removes that information from image classification processing. Thus, in the example above, the classified object of "license plate"

now has classification attributes, i.e. the license plate number, hidden that cannot be used for visual classification analysis.

Embodiments of the present invention provide a method, computer program, and computer system for applying data masking techniques to image masking in order to remove personal and sensitive information while still maintaining the classificational value of the image for cognitive visual analysis. More particularly, embodiments of the present invention implement image classification masking to a corpus of images before they are ingested by a visual analysis system to detect insights and trends. Further, embodiments of the present invention apply image classification masking to attributes of classified images using substitution image classification masking, variance image classification masking, and/or shuffling image classification masking. Thus, the embodiments of the present invention apply data masking techniques to images to create image classification masking whereby the classification elements of the image remain intact but the sensitive or personal elements are removed from the image. The masked images generated by the present invention can then be processed by cognitive systems for visual classification analysis to derive trends, while not exposing sensitive information.

Reference will now be made in detail to the embodiments of the present invention, examples of which are illustrated in the accompanying drawings, wherein like reference numerals refer to like elements throughout. Embodiments of the invention are generally directed to a system for image classification and masking.

FIG. 1 illustrates a image classification and masking system 100, in accordance with an embodiment of the invention. In an example embodiment, image classification and masking system 100 includes an image device 110, a user device 120, and server 130, interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN), or a wired or wireless personal area network (PAN). In general, the network 140 can be any combination of connections and protocols that will support communications between the data device 110, the user device 120, and the server 130.

The image device 110 may include the image datastore 112. The image device 110 may be any device capable of capturing, collecting, organizing, and/or storing the image data 114. The image data 114 may include, but is not limited to, visual, audio, and/or textual data. For example, the image device 110 may capture, collect, organize, and/or store image data 114 such as, but not limited to, photos, videos, and textual documents etc. In the example embodiment, the image device 110 may be a camera, a video recorder, a computer, a tablet, a thin client, a cellphone, or any other device capable of capturing, collecting, organizing, and/or storing the image data 114 and sending the image data 114 to and from other computing devices, such as the user device 120, and the server 130 via the network 140. The image device 110 is described in more detail with reference to FIG. 3.

The image datastore 112 may store the image data 114, i.e. the visual, audio, and/or textual data, being captured, collected, organized, and/or stored by the image device 110. The image datastore 112 may be any storage media capable of storing data, such as, but not limited to, storage media resident in the image device 110 and/or removeable storage media. For example, the image datastore 112 may be, but is not limited to, a hard drive, a solid stated drive, a USB drive, or a memory card, etc. In various embodiments, all or part of the image datastore 112 may be installed and run on the image device 110. The image datastore 112 is described in more detail above and with reference to FIG. 3.

The user device 120 may include the user interface 122. In the example embodiment, the user device 120 may be a cellphone, desktop computer, a notebook, a laptop computer, a tablet computer, a thin client, or any other electronic device or computing system capable of storing compiling and organizing audio, visual, or textual content, such as the image data 114, and receiving and sending that content to and from other computing devices, such as the image device 110, and the server 130 via the network 140. While only a single user device 120 is depicted, it can be appreciated that any number of user devices may be part of the data classification and masking system 100. In some embodiments, the user device 120 includes a collection of devices or data sources. While the user device 120 is depicted as separate from the server 130, it can be appreciated that the user device 120 and the server 130 may be the same device. The user device 120 is described in more detail with reference to FIG. 3.

The user interface 122 includes components used to receive input from a user on the user device 120 and transmit the input to the image classification and masking program 136 residing on the server 130, or conversely to receive information from the image classification and masking program 136 and display the information to the user on user device 120. In an example embodiment, the user interface 122 uses a combination of technologies and devices, such as device drivers, to provide a platform to enable users of the user device 120 to interact with the image classification and masking program 136. In the example embodiment, the user interface 122 receives input, such as but not limited to, textual, visual, or audio input received from a physical input device, such as but not limited to, a keypad, a mouse, a touchscreen, and/or a microphone.

The server 130 may include the program datastore 132 and the image classification and masking program 136. In the example embodiment, the server 130 may be a desktop computer, a notebook, a laptop computer, a tablet computer, a thin client, or any other electronic device or computing system capable of storing compiling and organizing audio, visual, or textual content and receiving and sending that content to and from other computing devices, such as the image device 110, and the user device 120 via network 140. In some embodiments, the server 130 includes a collection of devices, or data sources, in order to collect the program data 134. The server 130 is described in more detail with reference to FIG. 3.

The program datastore 132 may store the program data 134. The program datastore 132 may be any storage media capable of storing data, such as, but not limited to, storage media resident in the server 130 and/or removeable storage media. For example, the program datastore 132 may be, but is not limited to, a hard drive, a solid stated drive, a USB drive, or a memory card, etc. In various embodiments, all or part of the program datastore 132 may be installed and run on the server 130. The program datastore 132 is described in more detail above and with reference to FIG. 3.

The program data 134 may be a collection of audiovisual content including, but not limited to, audio, visual, and textual content. The program data 134 may be, for example, the image data 114 received and/or collected from the image device 110 and/or the user device 120. Further, the program data 134 may include image data 114 that has been classified and/or masked by the image classification and masking program 136. Examples of classified and/or masked data will be described in more detail below with reference to FIGS. 1b-1h. The program data 134 is located on the server 130 and may be accessed via the network 140. In accordance with an embodiment of the invention, the program data 134 may be located on one or a plurality of servers 130.

The image classification and masking program 136 is a program capable of receiving the image data 114 captured by the data device 120 and analyzing the image data 114 to classify and mask certain attributes of the image data 114. Further, embodiments of the image classification and masking program 136 may incorporate the masked data into a corpus of data for further data analysis. The image classification and masking program 136 is described in more detail below with reference to FIG. 1b.

Figure 1B:
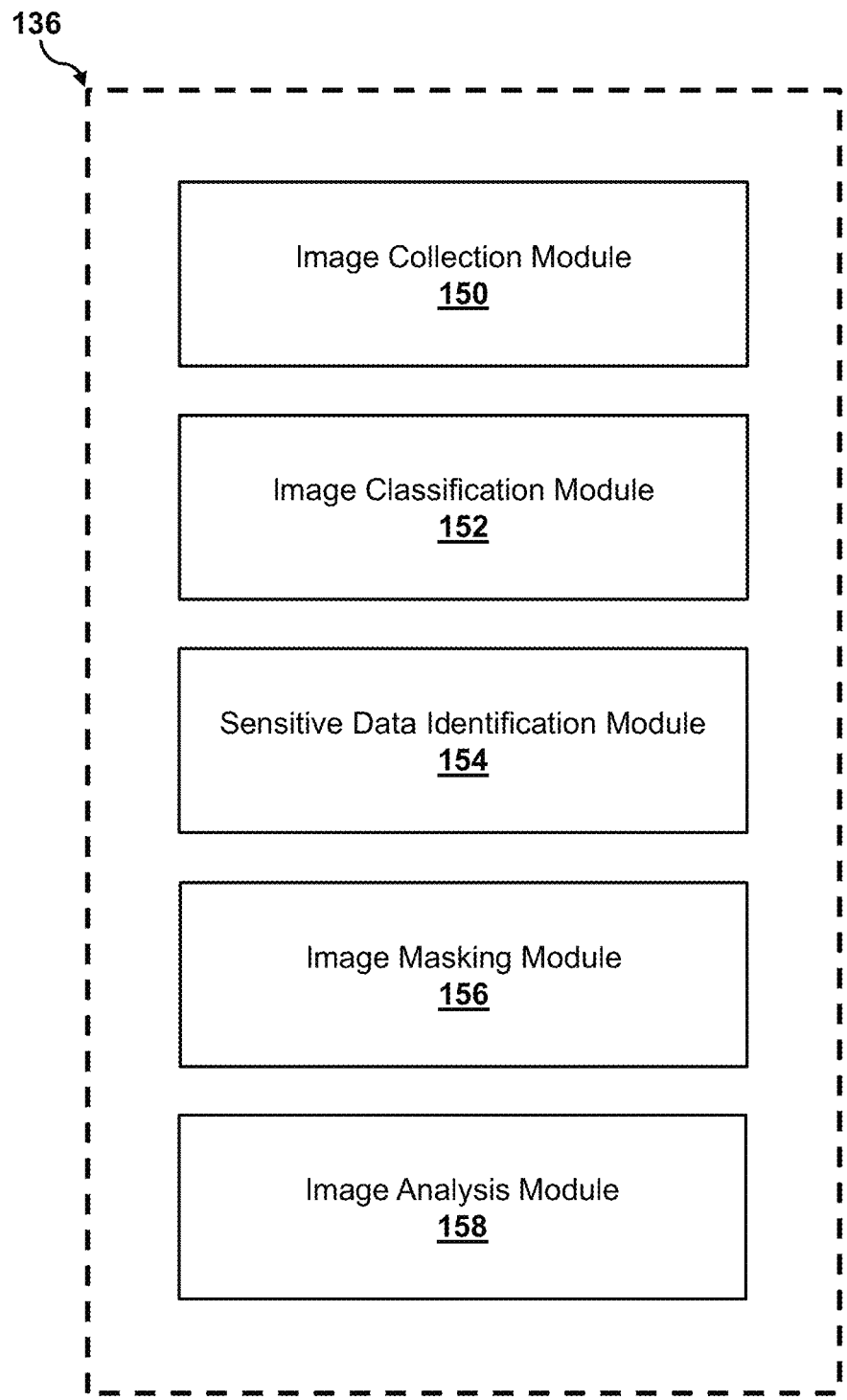

FIG. 1b illustrates example modules of the image classification and masking program 136. In an example embodiment, the image classification and masking program 136 may include five modules: image collection module 150, image classification module 152, sensitive data identification module 154, image masking module 156, and image analysis module 158.

The image collection module 150 receives the image data 114 captured from the image device 110. The image collection module 150 may receive the image data 114 directly from the image device 110 or via the user device 120. In an embodiment of the invention, the image data 114 may be stored as the program data 134 on the program datastore 132. For example, but not limited to, the image device 110 may capture a plurality of photos. The plurality of photos captured by the image device 110 would then be sent to the server 130 directly from the image device 110 or through the user device 120 via the user interface 122. The plurality of photos would be received by the image collection module 150 of the image detection and identification program 136.

The image classification module 152 classifies the image data 114 to identify features contained within the image data 114 received by the image collection module 150. The image classification module 152 may utilize visual recognition classification to classify the image data 114 received by the image collection module 150 according to various features such as, but not limited to, scenes, geography, objects, people, faces, colors, food, text, etc. Further, each metric may be associated with one or more attributes. For example, an image within the image data 114 may be classified as containing one or more cars and the attributes may include, but are not limited to, the make of the car(s), the model of the car(s), the year of the car(s), the type of the car(s), the color of the car(s), the license plate(s) of the car(s), etc. As another example, an image within the image data 114 may be classified as containing one or more people and the attributes may include, but are not limited to, gender, age range, ethnicity, height, hair color, eye color, etc. The visual recognition classification utilized by the image classification module may be any visual recognition classification service such as, but not limited to, the IBM Watson™ Visual Recognition service.

The sensitive data identification module 154 analyzes the classified image data 114 to determine if the image data 114 contains one or more sensitive attributes. The attributes associated with each classification feature may include sensitive attributes which may be defined manually or automatically. In an embodiment where the sensitive attributes are defined manually, a user may specify which attributes should be treated as sensitive by the image classification and masking program 136 via the user interface 122. For example, but not limited to, a user may specify that people's faces and car license plates are to be treated as sensitive attributes by the image classification and masking program 136. In an embodiment where the sensitive attributes are defined automatically, the image classification and masking program 136 may utilize a rules-engine application to define sensitive attributes, such as, but not limited to, people's faces and car license plates, etc.

The image masking module 156 applies a masking technique to the image data 114 determined to contain a sensitive attribute to generate one or more masked images. The image masking module 156 may use image classification masking technique such as, but not limited to, substitution image classification masking, variance image classification masking, and shuffling image classification masking, etc.

Figure 1C:
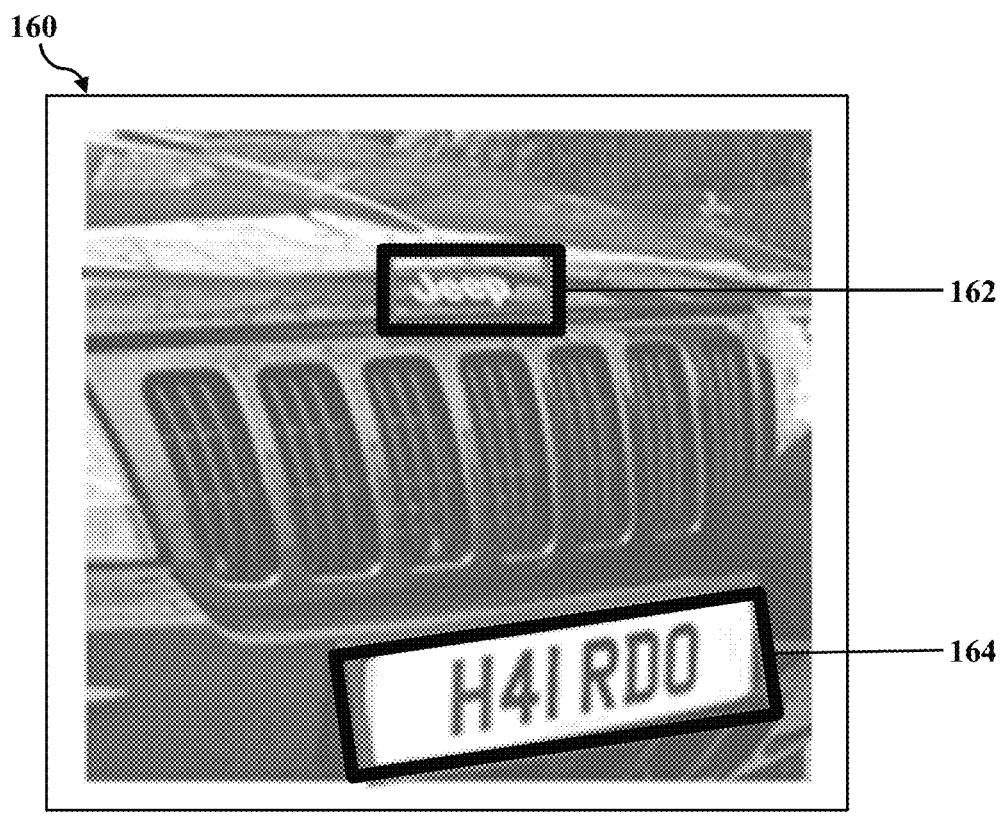
FIG. 1c illustrates an example image containing sensitive attributes.
Figure 1D:
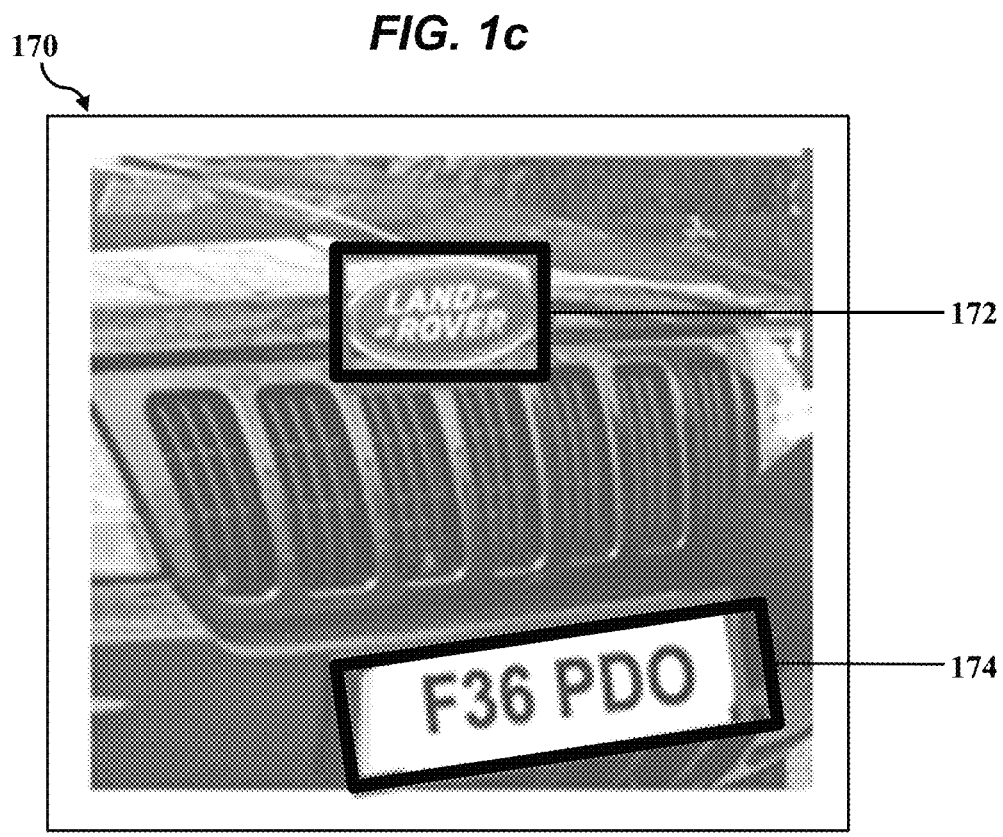
FIG. 1d illustrates an example masked image generated using substitution image classification masking.

Substitution image classification masking substitutes features containing sensitive attributes of the image data 114 with similar classification features and attributes. For example, but not limited to, an image within the image data 114 may contain a person's face and the image masking module 156 may utilize substitution image classification masking to substitute the person's face with anther face containing similar attributes, e.g. gender, age range, and ethnicity, etc. Thus, the privacy of the person pictured in the image is protected. Referring to FIGS. 1c-1d, another non-limiting example of substitution image classification masking is illustrated. The image 160 contained within the image data 114 contains a vehicle, e.g. a classification feature, with the decal 162 displaying the vehicle's brand name and a vehicle license plate 164, e.g. classification feature attributes. The image masking module 156 may utilize substitution image classification masking to substitute the decal 162 displaying the vehicle's brand name and the vehicle license plate 164 with similar attributes to generate the masked image 170. The substitute attributes contain similar characteristics as the sensitive attributes such as, but not limited to, similar State/Country of origin, custom license plate personalization, letters, and numbers, etc. The masked image 170 contains decal 172 and vehicle license plate 174, which display a vehicle brand name similar to the one displayed in decal 162, e.g. another SUV brand name, and a vehicle license plate number similar to the vehicle license plate 164, e.g. same by number of letters and numbers and same Country of origin. In embodiments where the image classification and masking program 136 utilizes substitution image classification masking for attributes containing numbers, the masked image containing the substitute attributes, i.e. substituted numbers, may be validated using a checksum formula such as, but not limited to the Luhn algorithm to ensure the substitute attributes are not the same or too similar to the original attributes.

Figure 1E:
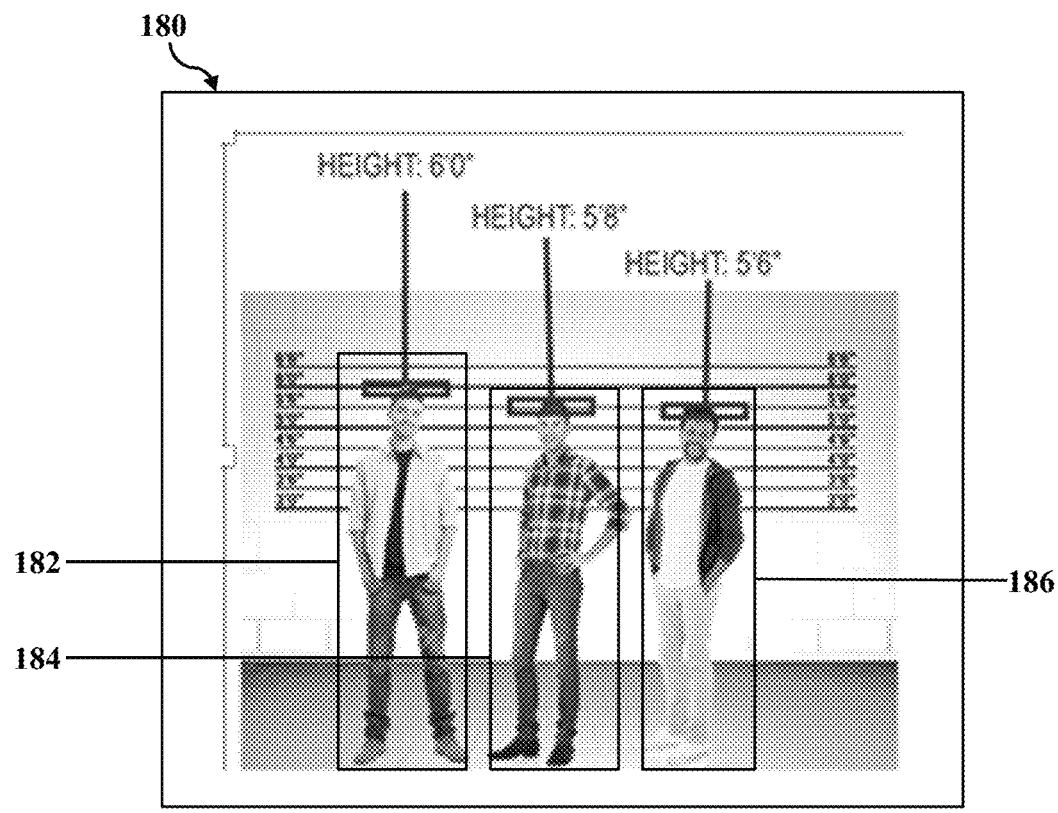
FIG. 1e illustrates an example image containing sensitive attributes.
Figure 1F:
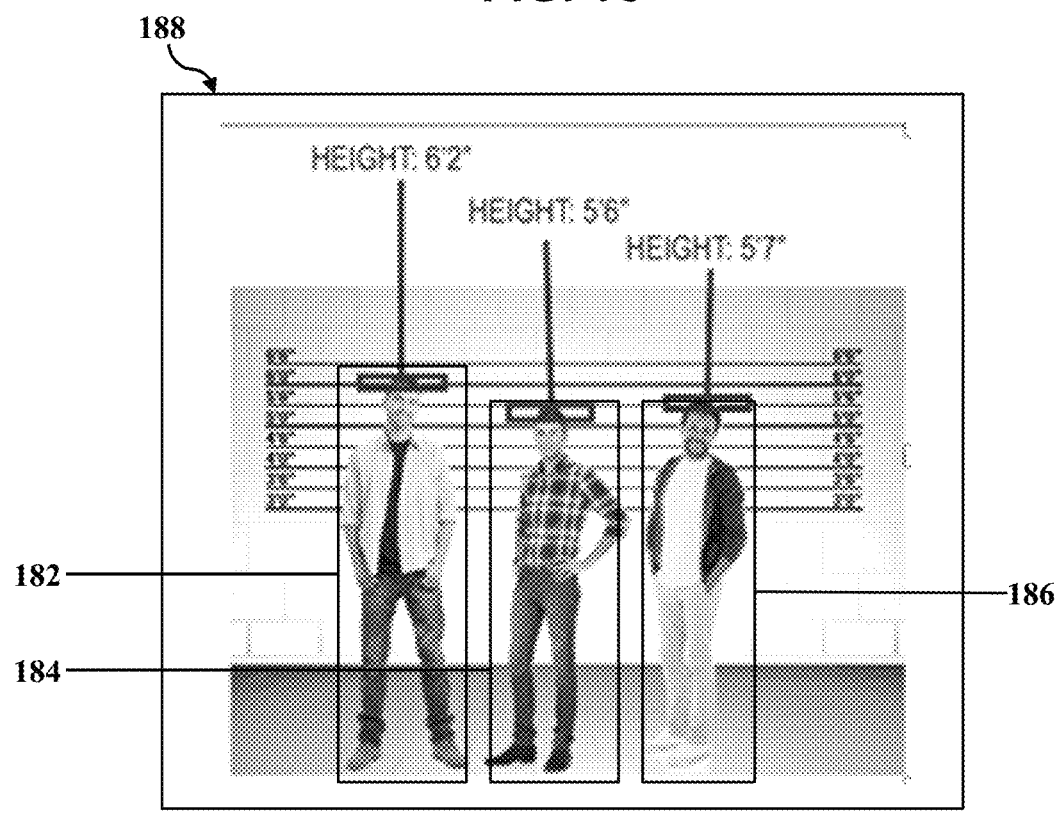
FIG. 1f an example masked image generated using variance image classification masking.

Variance image classification masking adjusts the value of a sensitive attribute. The image masking module 156 may utilize variance image classification masking to adjust the value of an attribute by a given threshold, such as, but not limited to +/−10%. Referring to FIG. 1e-1f, a non-limiting example of variance image classification masking is illustrated. The image 180 contained within the image data 114 displays a line-up with person 182, person 184, and person 186, e.g. classification features, each person 182-184 having a certain height, e.g. a classification feature attributes. In the image 180, person 182 has a height of 6 feet 0 inches, person 184 has a height of 5 feet 8 inches, and person 186 has a height of 5 feet 6 inches. The image masking module 156 may utilize variance image classification masking to adjust the heights of the persons 182-186 to generate the masked image 188. In the masked image 188, person 182 has a height of 6 feet 2 inches, person 184 has a height of 5 feet 6 inches, and person 186 has a height of 5 feet 7 inches. Thus, the image classification and masking program 136 protects the height classification attribute of each person 182-186, while preserving a meaningful range in the attribute data set.

Figure 1G:
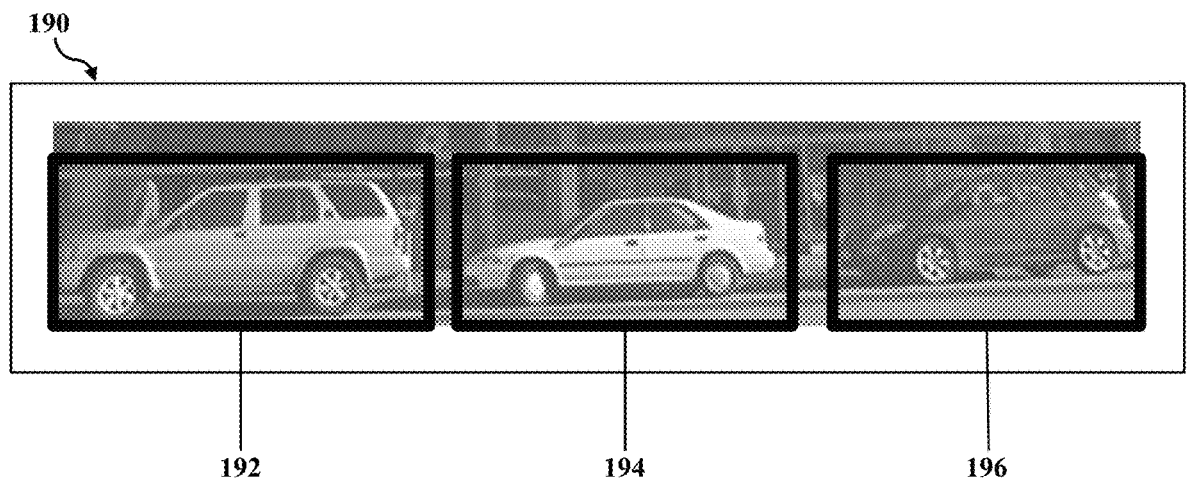
FIG. 1g illustrates an example image containing sensitive attributes.
Figure 1H:
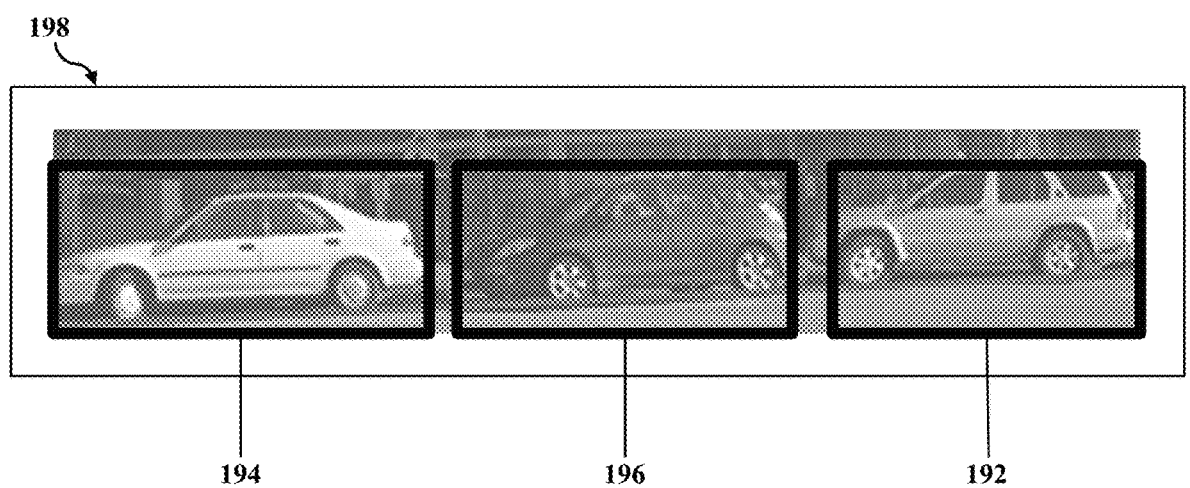
FIG. 1h an example masked image generated using shuffling image classification masking.

Shuffling image classification masking retains the classified features with sensitive attributes of a classified image but redistributes the locations of the classified features with the locations of similar classified features. Referring to FIGS. 1g-1h, a non-limiting example of shuffling image classification masking is illustrated. The image 190 contained within the image data 114 contains three vehicles in a particular order, e.g. a classification features, with each vehicle having different classification feature attributes such as different vehicle types, and different colors. In the image 190, vehicle 192 is located on the left of the image 190, vehicle 194 is located in the middle of vehicle 192 and vehicle 196, and vehicle 194 is located on the right of the image 190. The image masking module 156 may utilize shuffling image classification masking to redistribute the locations of the classification features with sensitive attributes, e.g. vehicles 192-196 to generate the masked image 198. In the masked image 198, vehicle 192 is located on the right of the image 190, vehicle 194 is located on the left of the image 190, and vehicle 196 is located in the middle of vehicle 194 and vehicle 192. Thus, the image classification and masking program 136 protects the location classification feature attribute of vehicle 192-196.

The image analysis module 158 generates a corpus of images from the received image data 114 and the generated masked images. The corpus of images may include any original image data 114 that was determined not to contain any sensitive attribute data together with the generated masked data. Thus, any original image data 114 determined to contain sensitive attribute data is replaced with the masked image data generated from the original image data 114 determined to contain sensitive attribute data. The masked image analysis module 158 may transmit the corpus of images to a visual analysis system to detect insights and trends based on the corpus of images.

Figure 2:
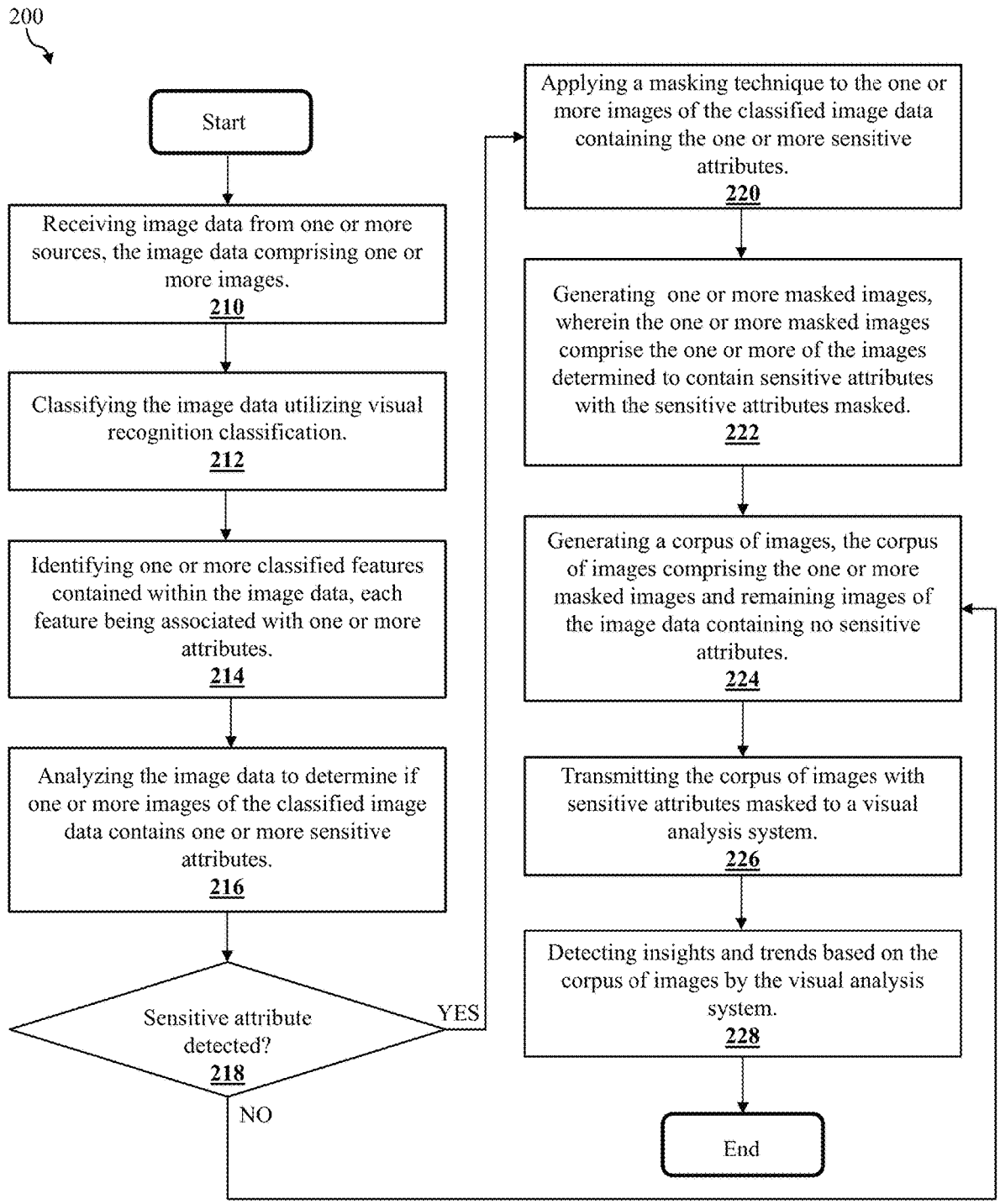
FIG. 2 is a flowchart illustrating an example method of image classification and masking in accordance with an embodiment of the invention.

Referring to FIG. 2, a method 200 for image classification and masking is depicted, in accordance with an embodiment of the present invention.

Referring to block 210, the image collection module 150 receives the image data 114 from one or more sources such as, but not limited to, the image device 110, and the user device 120. Image data collection is described in more detail above with reference to the image collection module 150 of FIG. 1b.

Referring to block 212, the image classification module 152 classifies the image data 114 received by the image collection module 150 utilizing visual recognition classification. Image classification is described in more detail above with reference to the image classification module 152 of FIG. 1b.

Referring to block 214, the image classification module 152 identifies one or more classified features contained within the classified image data 114, each feature being associated with one or more attributes. Classified feature identification is described in more detail above with reference to the image classification module 152 of FIG. 1b.

Referring to block 216, the sensitive data identification module 154 analyzes the image data 114 to determine if one or more of the images contains one or more sensitive attributes. Sensitive data identification is described in more detail above with reference to the sensitive data identification module 154 of FIG. 1b.

Referring to block 218, the image classification and masking program 136 determines if the image data 114 contains one or more images with one or more sensitive attributes. If the image classification and masking program 136 determines one or more images of the image data 114 does contain sensitive attributes, the image classification and masking program 136 proceeds to block 220. If the image classification and masking program 136 determines that none of the images of the image data 114 contain sensitive attributes, the image classification and masking program 136 proceeds to block 224.

Referring to block 220, the image masking module 156 applies a masking technique to the one or more images of the image data 114 containing the one or more sensitive attributes. Image masking is described in more detail above with reference to the image masking module 156 of FIG. 1b.

Referring to block 222, the image masking module 156 generates one or more masked images, the one or more masked images being the one or more of the images determined to contain sensitive attributes with the sensitive attributes masked. Masked image generation is described in more detail above with reference to the image masking module 156 of FIG. 1b.

Referring to block 224, the image analysis module 158 generates a corpus of images, the corpus of images comprising the one or more masked images and remaining images of the image data 114 containing no sensitive attributes. Image corpus generation is described in more detail above with reference to the image analysis module 158 of FIG. 1b.

Referring to block 226, the image analysis module 158 transmits the corpus of images with sensitive attributes masked to a visual analysis system. Transmission of the corpus of images is described in more detail above with reference to the image analysis module 158 of FIG. 1b.

Referring to block 228, the image analysis module 158 detects insights and trends based on the corpus of images by the visual analysis system. Insight and trend detection based on the corpus of images is described in more detail above with reference to the image analysis module 158 of FIG. 1b.

Figure 3:
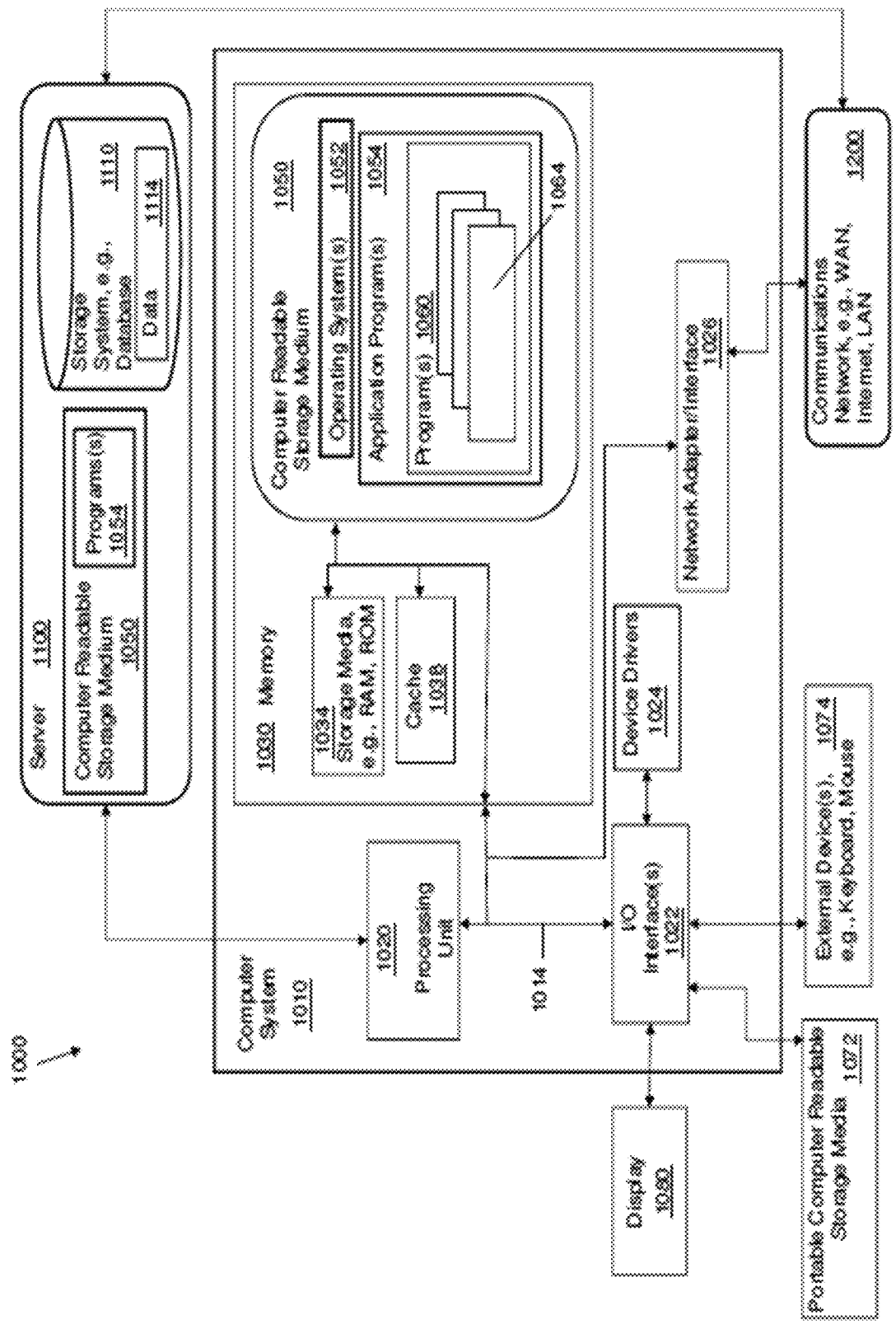
FIG. 3 is a block diagram depicting the hardware components of the image classification and masking system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 150-158 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
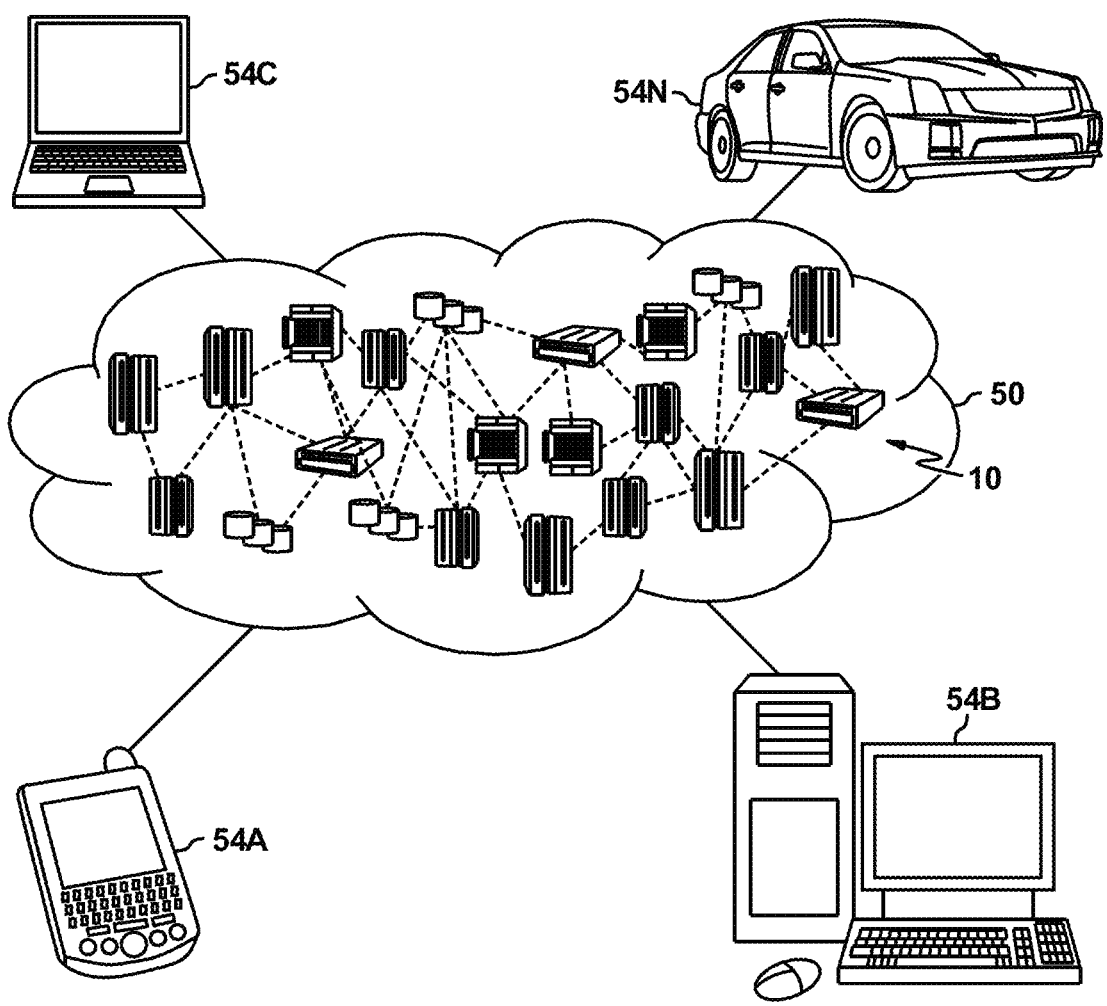
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
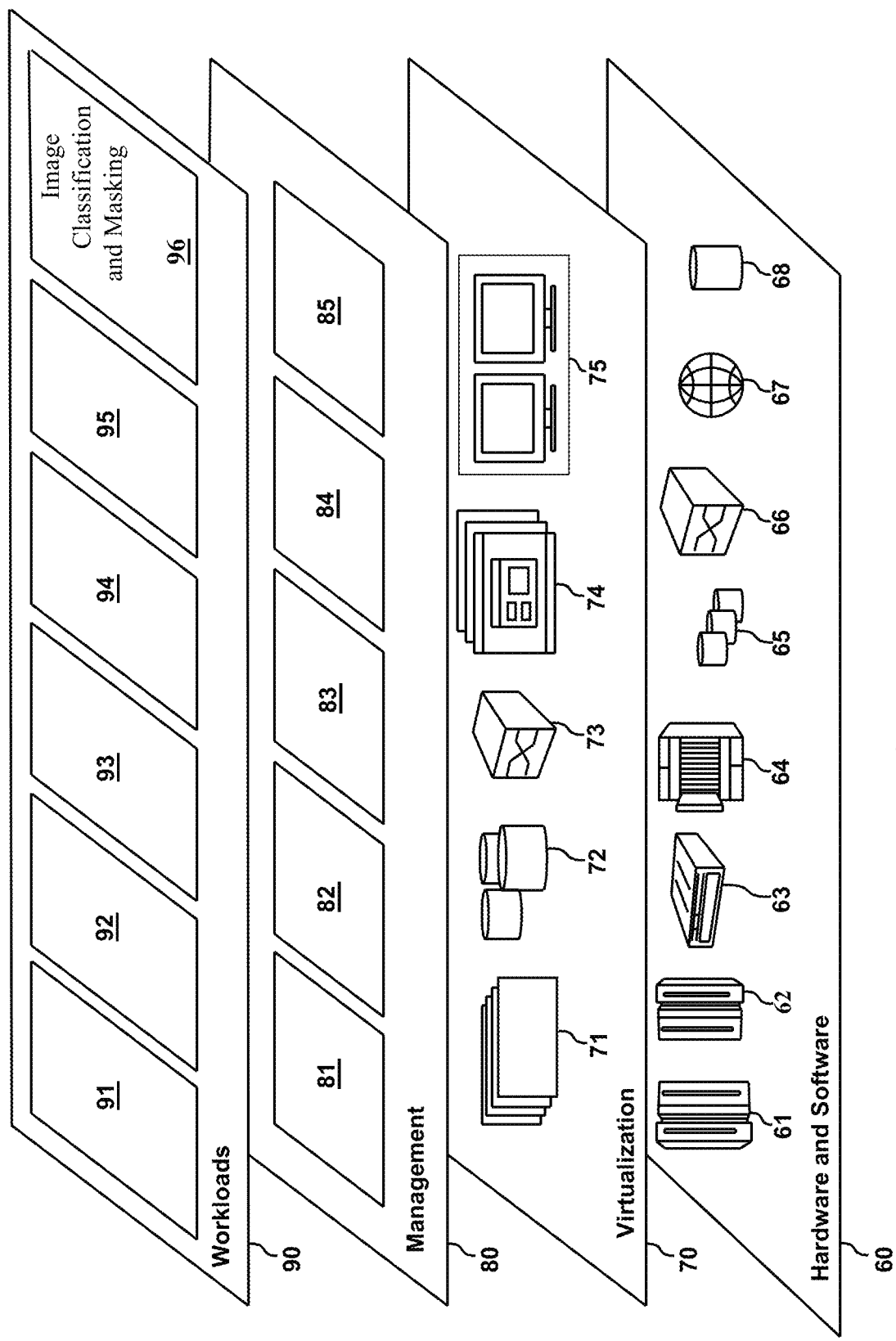
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image classification and masking 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for image classification and masking, the method comprising:
    classifying, by a computing device, the image data utilizing visual recognition classification;
    identifying, by the computing device, one or more classified features contained within the classified image data, each classified feature being associated with one or more attributes;
    analyzing, by the computing device, the classified image data to determine if one or more images of the classified image data contains one or more sensitive attributes;
    in response to determining one or more images of the classified image data contains one or more sensitive attributes, applying, by the computing device, a masking technique to the one or more images of the classified image data containing the one or more sensitive attributes, wherein the masking technique comprises of at least one of the group consisting of: substitution image classification masking, variance image classification masking, and shuffling image classification masking; and
    generating, by the computing device, one or more masked images, wherein the one or more masked images comprise the one or more of the images determined to contain sensitive attributes with the sensitive attributes masked.

2. A method as in claim 1, further comprising:
    generating, by the computing device, a corpus of images, the corpus of images comprising the one or more masked images and remaining images of the classified image data containing no sensitive attributes;
    transmitting, by the computing device, the corpus of images with sensitive attributes masked to a visual analysis system; and
    detecting, by the computing device, insights and trends based on the corpus of images by the visual analysis system.

3. A method as in claim 1, wherein analyzing, by the computing device, the classified image data to determine if one or more images of the classified image data contains one or more sensitive attributes, further comprises:
    identifying, by the computing device, user-defined sensitive attributes.

4. A method as in claim 1, wherein analyzing, by the computing device, the classified image data to determine if one or more images of the classified image data contains one or more sensitive attributes, further comprises:
    identifying, by the computing device, sensitive attributes based on sensitive attributes defined by a rules-engine application.

5. A method as in claim 1, wherein substitution image classification masking comprises:

substituting, by the computing device, the one or more classified features of the image data containing one or more sensitive attributes with similar classification features and attributes.

6. A method as in claim 1, wherein variance image classification masking comprises:
adjusting, by the computing device, a value of the one or more identified sensitive attributes.

7. A method as in claim 1, wherein shuffling image classification masking comprises:
redistributing, by the computing device, a location of the one or more classified features containing sensitive attributes within a classified image with a location of a similar classified feature.

8. A computer program product for image classification and masking, the computer program product comprising:
a computer-readable storage medium having program instructions embodied therewith, wherein the computer-readable storage medium is not a transitory signal per se, the program instructions comprising:
program instructions to classify, by a computing device, image data utilizing visual recognition classification;
program instructions to identify, by the computing device, one or more classified features contained within the classified image data, each classified feature being associated with one or more attributes;
program instructions to analyze, by the computing device, the classified image data to determine if one or more images of the classified image data contains one or more sensitive attributes;
in response to determining one or more images of the classified image data contain one or more sensitive attributes, program instructions to apply, by the computing device, a masking technique to the one or more images of the classified image data containing the one or more sensitive attributes, wherein the masking technique comprises of at least one of the group consisting of: substitution image classification masking, variance image classification masking, and shuffling image classification masking; and
program instructions to generate, by the computing device, one or more masked images, wherein the one or more masked images comprise the one or more of the images determined to contain sensitive attributes with the sensitive attributes masked.

9. A computer program product as in claim 8, further comprising:
program instructions to generate, by the computing device, a corpus of images, the corpus of images comprising the one or more masked images and remaining images of the classified image data containing no sensitive attributes;
program instructions to transmit, by the computing device, the corpus of images with sensitive attributes masked to a visual analysis system; and
program instructions to detect, by the computing device, insights and trends based on the corpus of images by the visual analysis system.

10. A computer program product as in claim 8, wherein substitution image classification masking comprises:
substituting, by the computing device, the one or more classified features of the image data containing one or more sensitive attributes with similar classification features and attributes.

11. A computer program product as in claim 8, wherein variance image classification masking comprises:
adjusting, by the computing device, a value of the one or more identified sensitive attributes.

12. A computer program product as in claim 8, wherein shuffling image classification masking comprises:
redistributing, by the computing device, a location of the one or more classified features containing sensitive attributes within a classified image with a location of a similar classified feature.

13. A computer system for image classification and masking, the system comprising:
one or more computer processors, one or more computer-readable storage media, and program instructions stored on the one or more computer-readable storage media for execution by at least one of the one or more processors, the program instructions comprising:
program instructions to classify, by a computing device, image data utilizing visual recognition classification;
program instructions to identify, by the computing device, one or more classified features contained within the classified image data, each classified feature being associated with one or more attributes;
program instructions to analyze, by the computing device, the classified image data to determine if one or more images of the classified image data contains one or more sensitive attributes;
in response to determining one or more images of the classified image data contain one or more sensitive attributes, program instructions to apply, by the computing device, a masking technique to the one or more images of the classified image data containing the one or more sensitive attributes, wherein the masking technique comprises of at least one of the group consisting of: substitution image classification masking, variance image classification masking, and shuffling image classification masking; and
program instructions to generate, by the computing device, one or more masked images, wherein the one or more masked images comprise the one or more of the images determined to contain sensitive attributes with the sensitive attributes masked.

14. A computer system as in claim 13, further comprising:
program instructions to generate, by the computing device, a corpus of images, the corpus of images comprising the one or more masked images and remaining images of the classified image data containing no sensitive attributes;
program instructions to transmit, by the computing device, the corpus of images with sensitive attributes masked to a visual analysis system; and
program instructions to detect, by the computing device, insights and trends based on the corpus of images by the visual analysis system.

15. A computer system as in claim 13, wherein substitution image classification masking comprises:
substituting, by the computing device, the one or more classified features of the image data containing one or more sensitive attributes with similar classification features and attributes.

16. A computer system as in claim 13, wherein variance image classification masking comprises:
adjusting, by the computing device, a value of the one or more identified sensitive attributes.

17. A computer system as in claim 13, wherein shuffling image classification masking comprises:

redistributing, by the computing device, a location of the one or more classified features containing sensitive attributes within a classified image with a location of a similar classified feature.

* * * * *